United States Patent
Hertz et al.

(10) Patent No.: US 12,496,744 B2
(45) Date of Patent: Dec. 16, 2025

(54) METHOD OF MAKING A BUILDING ELEMENT, AN APPARATUS FOR MAKING THE BUILDING ELEMENT, AND A BUILDING ELEMENT MADE BY THE METHOD

(71) Applicant: Abeo ApS, Hedehusene (DK)

(72) Inventors: Peter Hertz, Frederiksberg (DK); Morten Rasmussen, Lynge (DK)

(73) Assignee: ABEO ApS, Hedehusene (DK)

( * ) Notice: Subject to any disclaimer, the term of this patent is extended or adjusted under 35 U.S.C. 154(b) by 1117 days.

(21) Appl. No.: 16/363,360

(22) Filed: Mar. 25, 2019

(65) Prior Publication Data

US 2019/0322003 A1  Oct. 24, 2019

Related U.S. Application Data

(62) Division of application No. 14/896,075, filed as application No. PCT/DK2014/050155 on Jun. 3, 2014, now Pat. No. 10,239,228.

(30) Foreign Application Priority Data

Jun. 4, 2013 (DK) .......................... PA 2013 70305
Nov. 15, 2013 (DK) .......................... PA 2013 70691
Nov. 21, 2013 (DK) .......................... PA 2013 70713

(51) Int. Cl.
  *B28B 1/00* (2006.01)
  *B28B 1/08* (2006.01)
  (Continued)

(52) U.S. Cl.
  CPC .............. *B28B 1/008* (2013.01); *B28B 1/084* (2013.01); *B28B 1/16* (2013.01); *B28B 7/24* (2013.01);
  (Continued)

(58) Field of Classification Search
  CPC ........... B28B 1/008; B28B 1/084; B28B 1/16; B28B 7/24; B28B 19/003; B28B 23/02
  See application file for complete search history.

(56) References Cited

U.S. PATENT DOCUMENTS 602,274 A  4/1898  Sill
694,577 A  3/1902  Ransome
(Continued)

FOREIGN PATENT DOCUMENTS

BE  481221  3/1948
DE  4121113 A1  1/1992
(Continued)

OTHER PUBLICATIONS

Communication Pursuant to Article 94(3) EPC, European Patent Application No. 14728435.0, Nov. 19, 2018.
(Continued)

*Primary Examiner* — Galen H Hauth
*Assistant Examiner* — John Robitaille
(74) *Attorney, Agent, or Firm* — Saul Ewing LLP; Brian R. Landry

(57) ABSTRACT

The invention relates to the manufacture of a reinforced slab-shaped building element (E) having a length (L), a width (W) and a thickness, said slab-shaped building element (E) comprising an upper concrete plate anchored to a lower concrete plate with a top surface and a bottom surface, said upper concrete plate being cast from relatively higher strength concrete laid out upon said top surface, said lower concrete plate being of a less strong concrete, said lower concrete plate including a base contiguous with a plurality of raised portions integral therewith, said raised portions being spaced apart in the direction of said length (L) and said width (W), said plurality of raised portions defining between them a network of recesses, at least some of said recesses
(Continued)

Figure 1A:
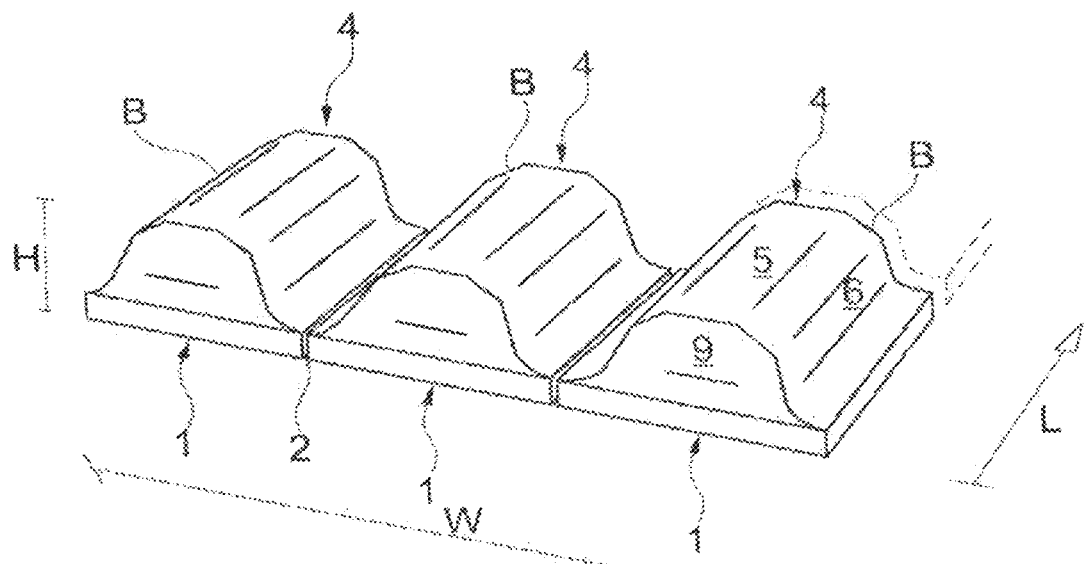

including reinforcing bars (R), said raised portions and said recesses together defining said top surface.

10 Claims, 13 Drawing Sheets

(51) Int. Cl.
*B28B 1/16* (2006.01)
*B28B 7/24* (2006.01)
*B28B 19/00* (2006.01)
*B28B 23/02* (2006.01)
*E04B 5/04* (2006.01)
*E04B 5/38* (2006.01)
*E04C 2/06* (2006.01)

(52) U.S. Cl.
CPC ............ *B28B 19/003* (2013.01); *B28B 23/02* (2013.01); *E04B 5/04* (2013.01); *E04B 5/38* (2013.01); *E04C 2/06* (2013.01)

(56) References Cited

U.S. PATENT DOCUMENTS

| | | | |
|---|---|---|---|
| 725,846 A | 4/1903 | Jackson | |
| 758,728 A | 5/1904 | Wight et al. | |
| 1,079,045 A | 11/1913 | Hammett | |
| 1,087,644 A | 2/1914 | Crane | |
| 1,254,919 A | 1/1918 | Marqua et al. | |
| 1,463,841 A | 8/1923 | Clinton/Richman | |
| 1,530,489 A | 3/1925 | Felix | |
| 1,530,851 A | 3/1925 | Paul | |
| 1,561,187 A | 11/1925 | Ramon | |
| 1,693,693 A | 12/1928 | Dexter | |
| 1,707,420 A | 4/1929 | Wales | |
| 1,803,109 A | 4/1931 | Goldsmith | |
| 1,807,315 A | 5/1931 | Thor | |
| 1,958,933 A | 5/1934 | Williams | |
| 1,974,130 A | 9/1934 | Wedberg | |
| 1,986,172 A | 1/1935 | Wilson | |
| 1,995,585 A | 3/1935 | Friedrich | |
| 3,469,816 A | 9/1969 | Blough et al. | |
| 3,592,437 A | 7/1971 | Dashew | |
| 3,638,902 A | 2/1972 | Bergan | |
| 3,707,819 A | 1/1973 | Calhoun et al. | |
| 4,094,941 A | 6/1978 | Manners et al. | |
| 4,243,200 A | 1/1981 | Beer et al. | |
| 4,389,036 A | 6/1983 | Abou-Ezzeddine | |
| 4,442,056 A | 4/1984 | Slepcevic | |
| 4,468,911 A | 9/1984 | Daga | |
| RE31,753 E | 12/1984 | Lavergne, Jr. | |
| 4,486,000 A | 12/1984 | Klaiss | |
| 4,599,840 A | 7/1986 | Ingvarsson et al. | |
| 4,979,720 A | 12/1990 | Robinson | |
| 5,487,526 A | 1/1996 | Hupp et al. | |
| 5,733,470 A | 3/1998 | Roth et al. | |
| 5,934,036 A | 8/1999 | Gallagher | |
| 6,773,650 B1 * | 8/2004 | Longo .................. B28B 7/0044 264/228 |
| 7,814,719 B2 | 10/2010 | Cretti | |
| 2012/0167519 A1 | 7/2012 | Guenther | |

FOREIGN PATENT DOCUMENTS

| | | |
|---|---|---|
| EP | 1614823 B1 | 1/2008 |
| FR | 2555630 B1 | 8/1986 |
| GB | 690984 A | 5/1953 |
| JP | 57020310 A | 2/1982 |
| JP | 07268994 A | 10/1995 |
| JP | 2005248674 A | 9/2005 |
| JP | 2013002242 A | 1/2013 |
| NL | 8100138 A | 8/1982 |

OTHER PUBLICATIONS

International Preliminary Report on Patentability, International Patent Application No. PCT/DK2014/050155, Dec. 17, 2015.
International Search Report and Written Opinion, International Patent Application No. PCT/DK2014/050155, Jul. 24, 2014.
Notice of Reason for Refusal, Japanese Patent Application No. 2016-517169, Feb. 6, 2018.
Search Report, DK Application No. PA 2013 70305, Jan. 17, 2014.

\* cited by examiner

METHOD OF MAKING A BUILDING ELEMENT, AN APPARATUS FOR MAKING THE BUILDING ELEMENT, AND A BUILDING ELEMENT MADE BY THE METHOD

This patent application is a divisional application, pursuant to 35 U.S.C. § 121, of U.S. patent application Ser. No. 14/896,075, filed Dec. 4, 2015, which is a U.S. national phase application, pursuant to 35 U.S.C. § 371, of PCT international application number PCT/DK2014/050155, filed Jun. 3, 2014, designating the United States and published in English, which claims priority to and the benefit of Danish Patent Application No. PA 2013 70305, filed Jun. 3, 2013, Danish Patent Application No. PA 2013 70691, filed Nov. 15, 2013, and Danish Patent Application No. PA 2013 70713, filed Nov. 21, 2013, all of which are herein incorporated by reference in their entirety.

The present invention relates generally to the manufacturing of reinforced slab-shaped building elements having a length, a width and a thickness, the slab-shaped building element comprising an upper concrete plate anchored to lower concrete, with a top surface of the lower concrete defining an internal interface, and with the lower concrete also defining the bottom face of the building element. The upper concrete plate is cast from relatively higher strength concrete laid out upon the top surface of the lower concrete, the lower concrete portion being of a less strong concrete. One example of such a building element is disclosed in BE patent 481 221 where the lower concrete is constituted by a plurality of porous concrete blocks arranged next to each other and with intermediate U-shaped channel elements. DE 226 154 shows another slab-shaped building element with U-shaped channel elements.

Building elements of this type are sometimes preferred as an alternative to conventional slab-shaped building elements of the type having internal parallel tubular hollow ducts in usually having a reduced overall weight, improved acoustical properties and a high resistance to structural damage resulting from exposure to fire. However, in some cases the prior art building elements do not give satisfactory results from an acoustical and aesthetical point of view.

The object of the present invention is to provide a method for making an improved building element, an apparatus suitable for making the building element, and an improved building element made using the novel method. The building element may by way of example be used as a horizontal element in building structures, such as a floor element in buildings having supporting concrete or steel structures.

More specifically, a building element made according to the present invention includes a lower concrete plate that has a base that is contiguous with a plurality of upwardly projecting raised portions integral therewith, with the raised portions being spaced apart in the direction of the length and width, and with the plurality of raised portions defining between them a network of recesses, at least some of the recesses including reinforcing bars. The raised portions and the recesses together define the aforementioned top surface and the upper concrete plate forms a plurality of virtual compression arches having a height in the direction of said thickness increasing from the raised portions towards said recesses. With the invention there is also a reduced tendency for local heat transmission since the concrete cast on top of the lower concrete plate cannot flow to the bottom surface of the lower concrete plate.

Preferably, the lower concrete plate is of a porous concrete with an expanded clay aggregate of median size of 4-10 mm, possibly with a minor 0-4 mm fraction, and in addition thereto fine sand.

The method of making the building element, and the apparatus suitable therefore, involves using dedicated raised portions molds and discharging a first type and low strength concrete from each raised portions mold while vibrating the concrete so as to form the contiguous lower concrete plate without non-bonded interfaces between the discharged material.

The invention will be discussed further below, with reference to the drawings which show a presently preferred embodiment.

Figure 1B:
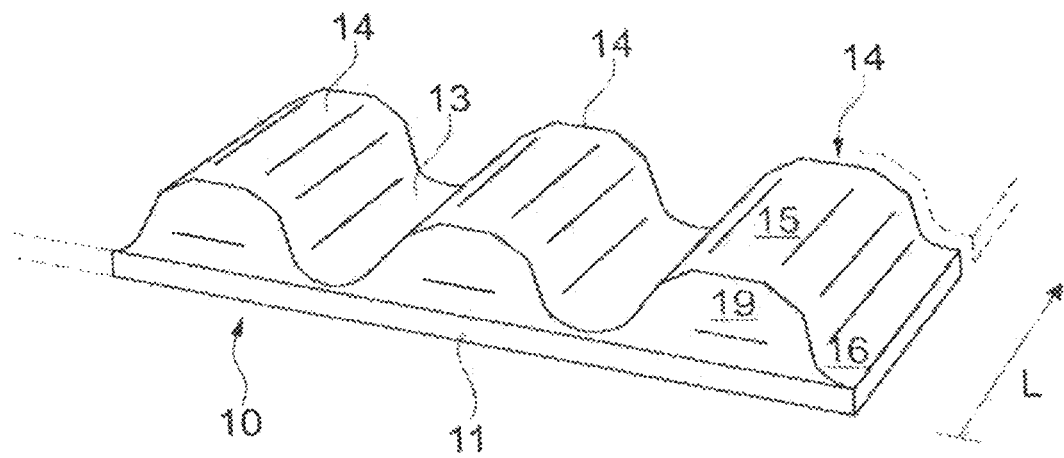
Figure 2:
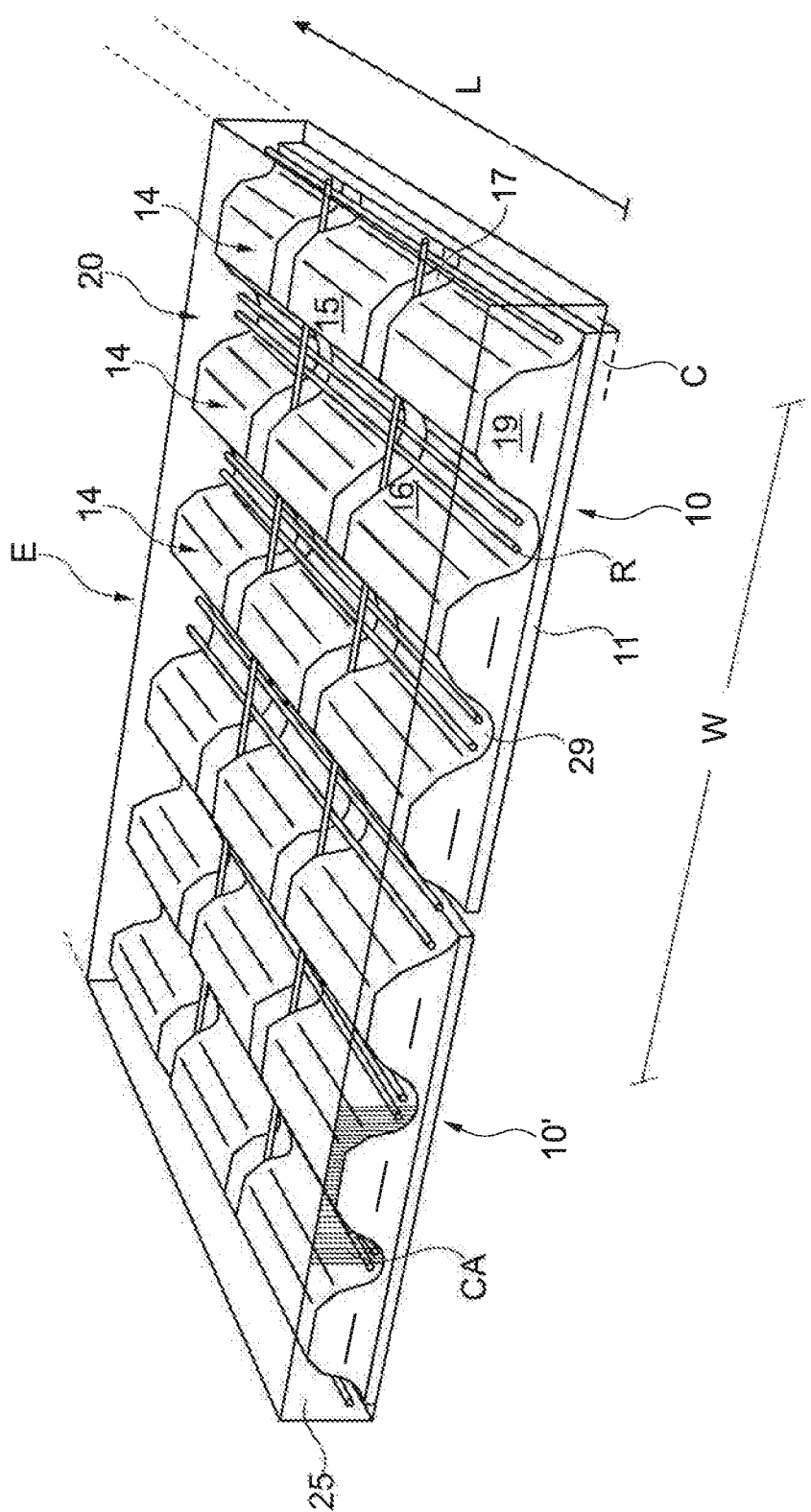
Figure 3:
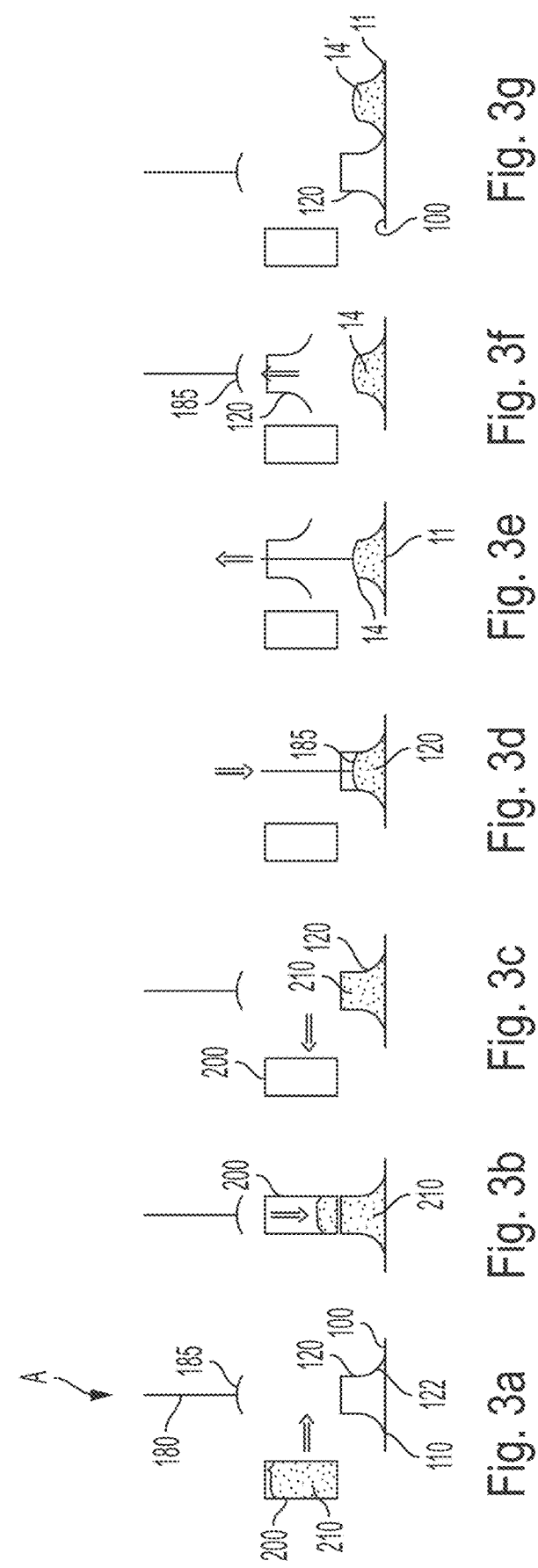
Figure 4:
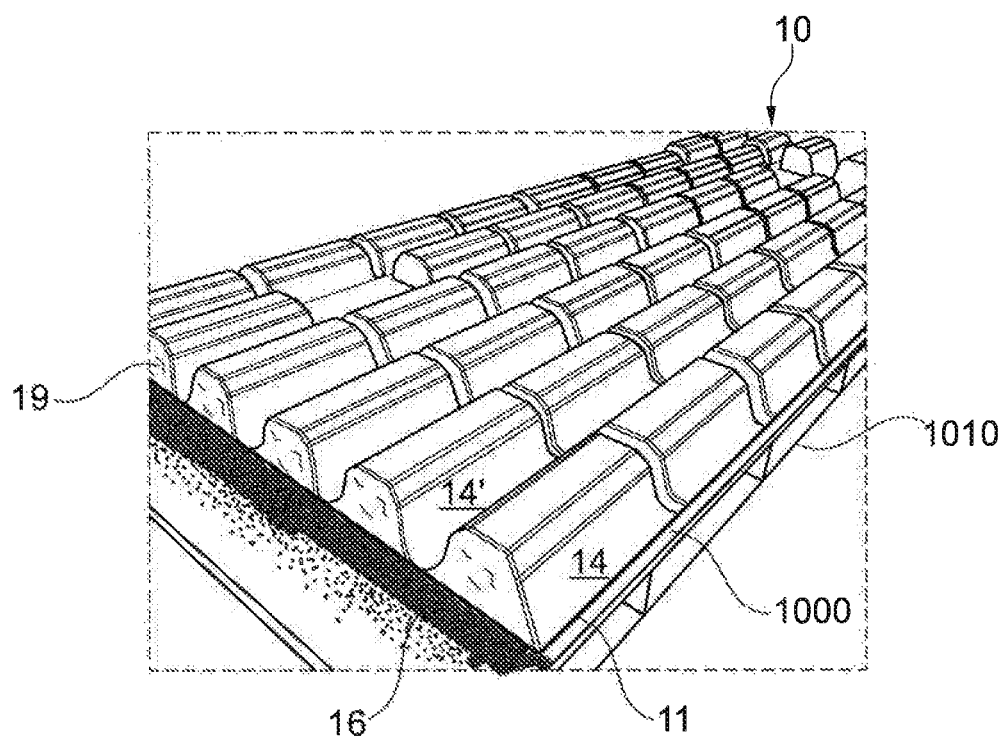
Figure 8:
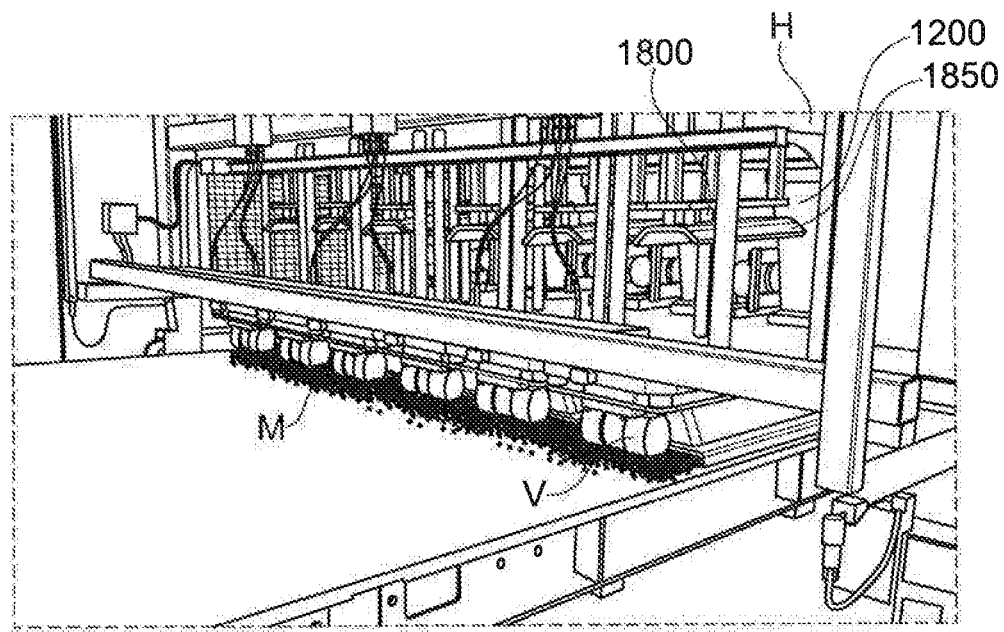
Figure 9:
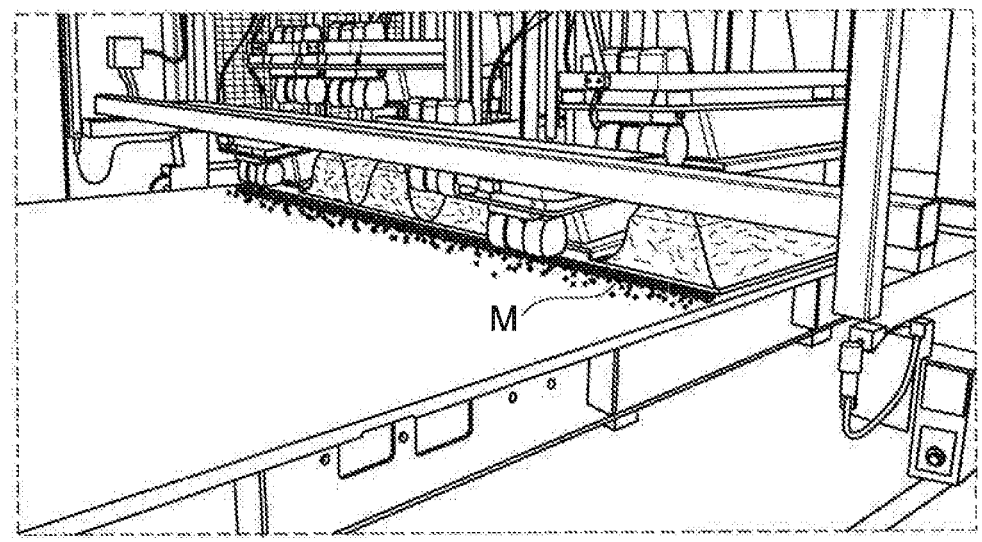
Figure 10:
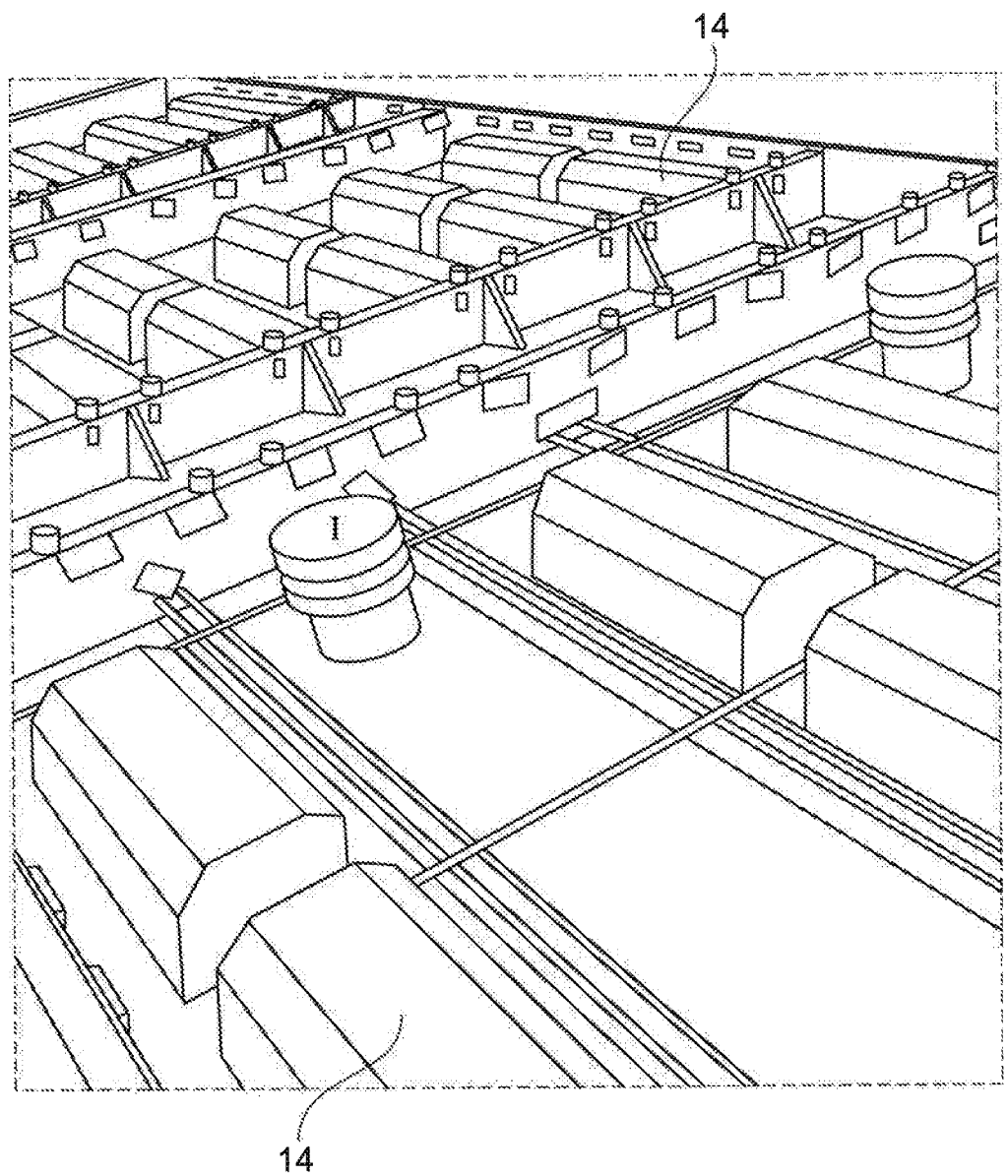
Figure 11:
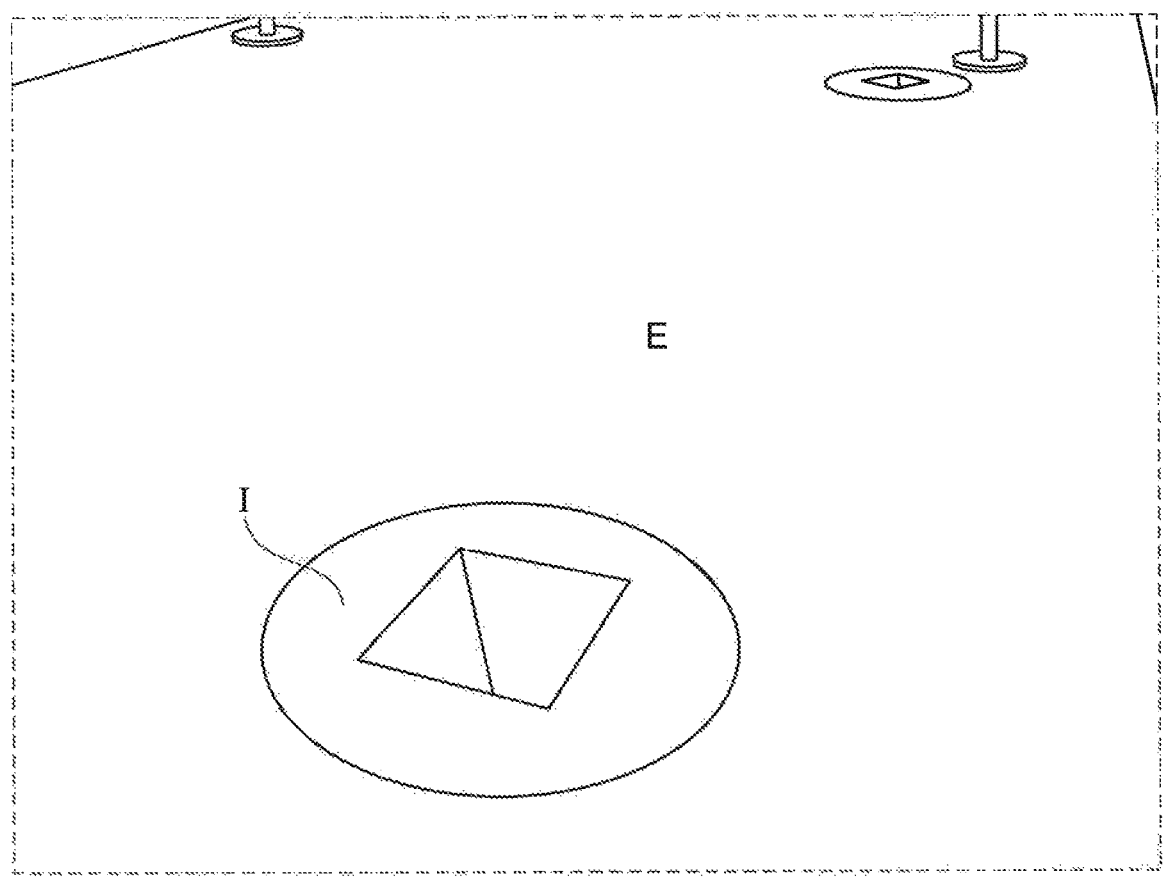
Figure 12:
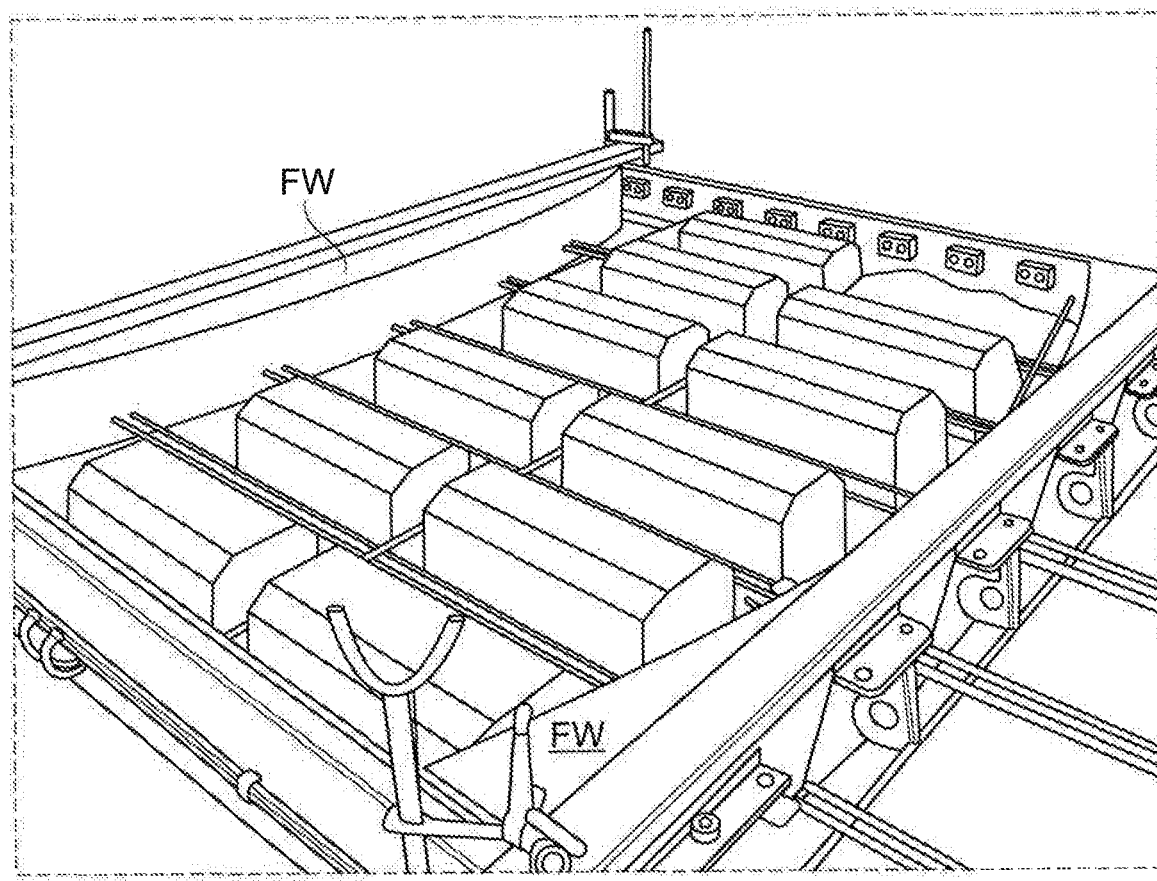
Figure 13:
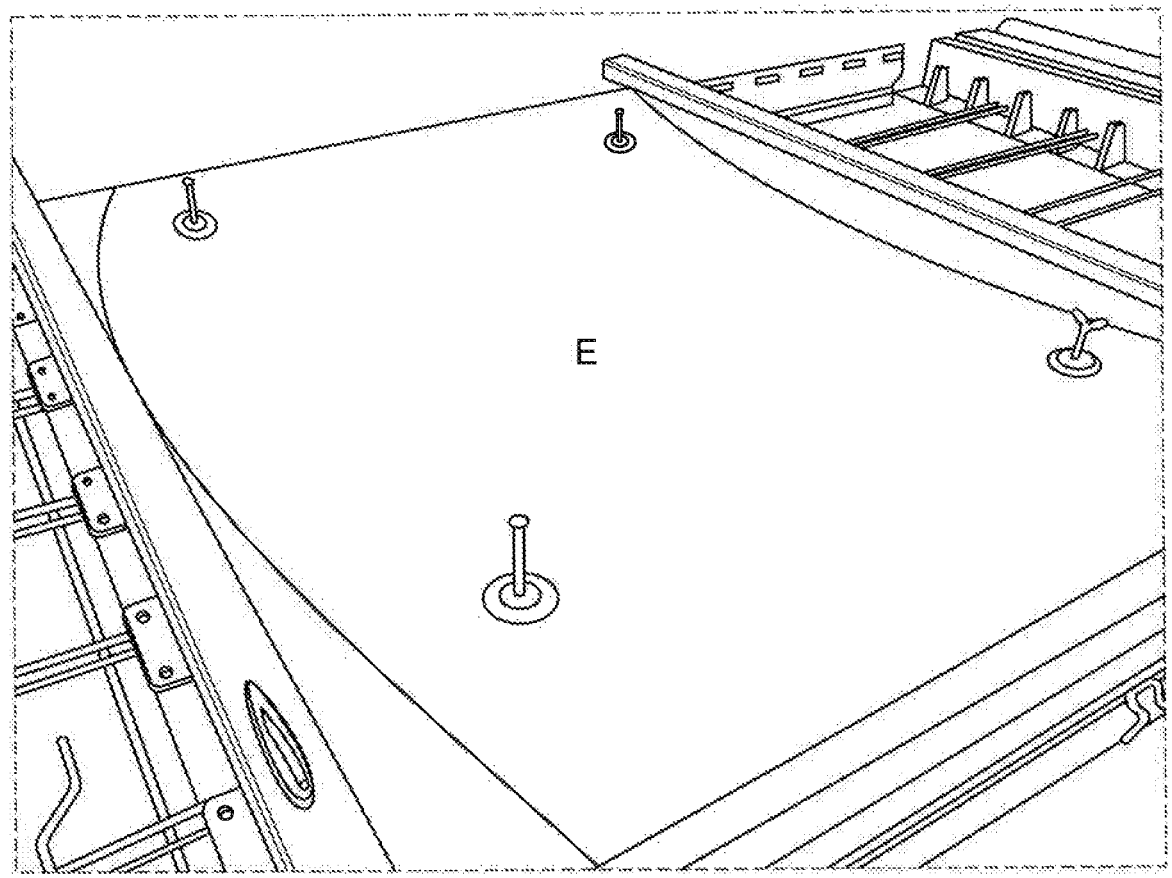
Figure 14:
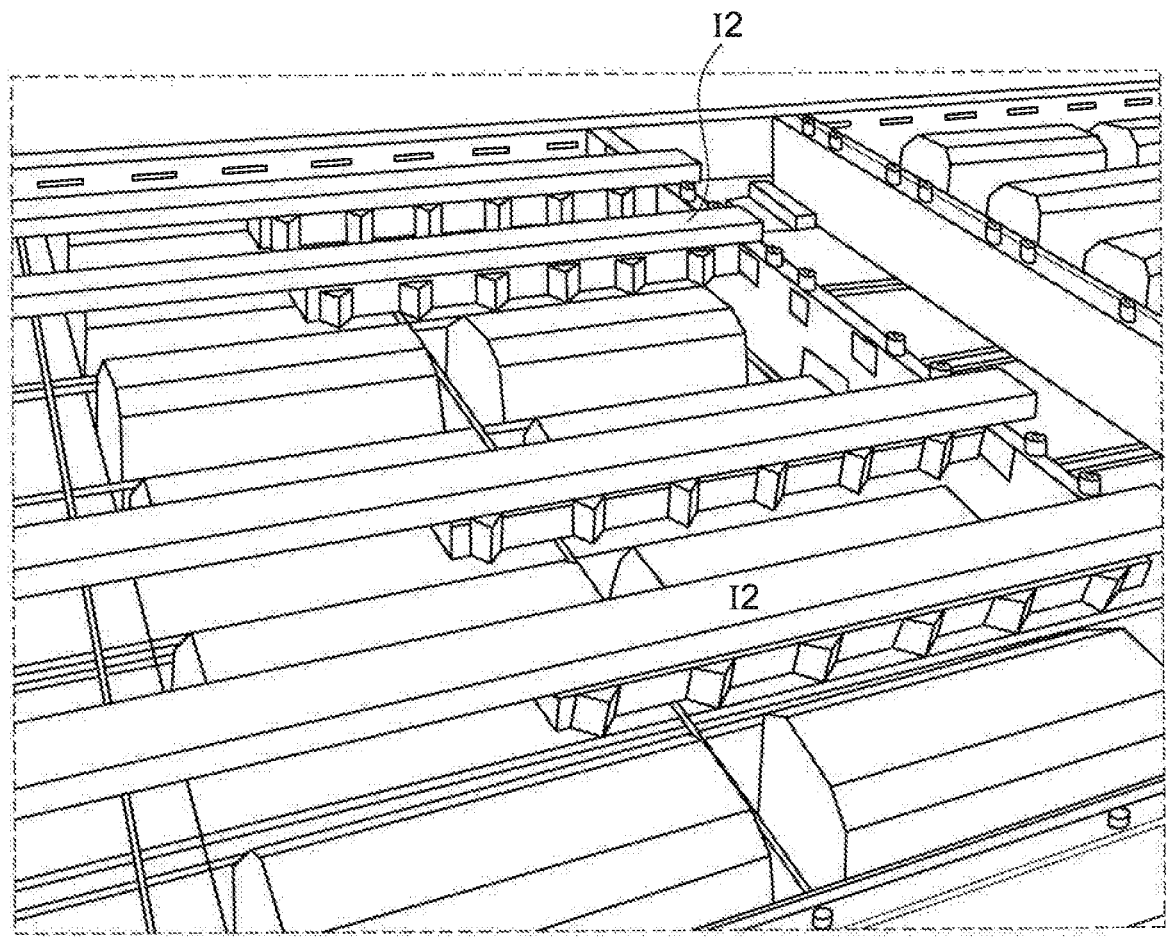
Figure 15:
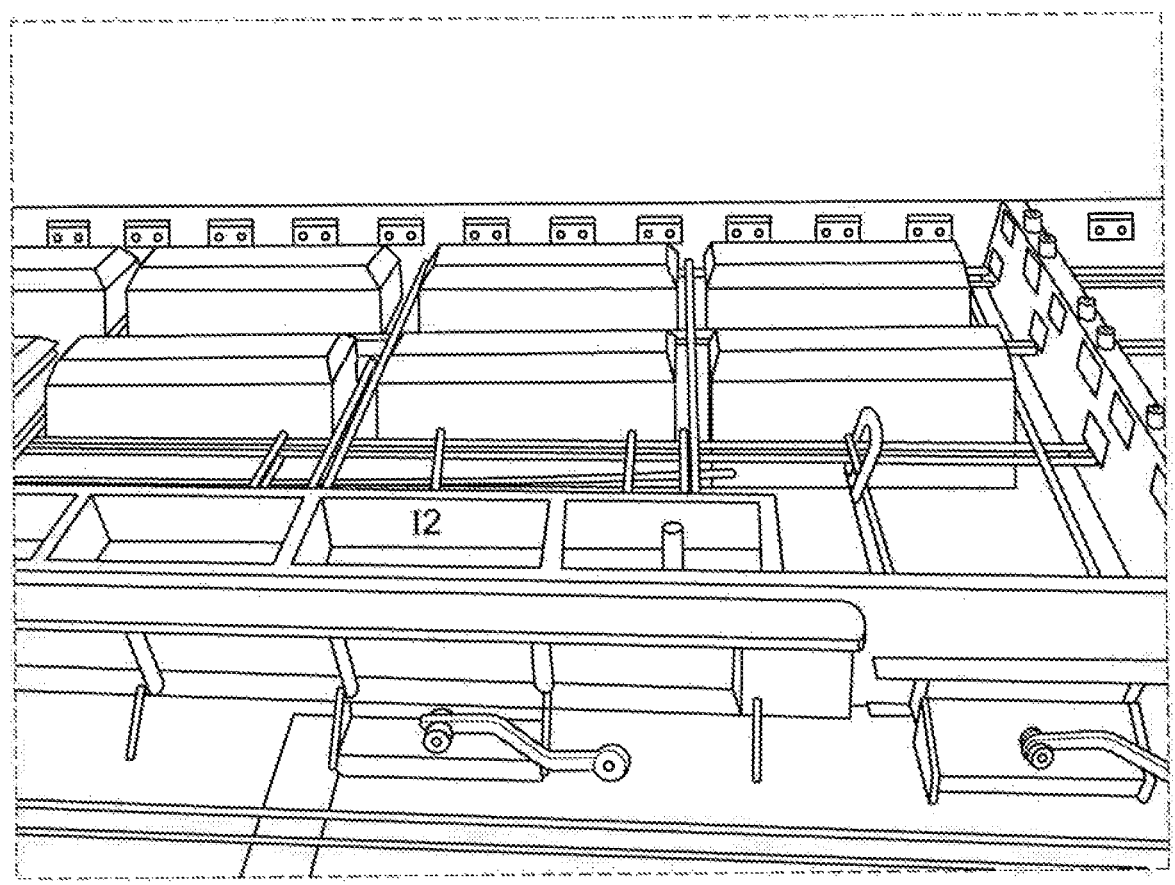
Figure 16:
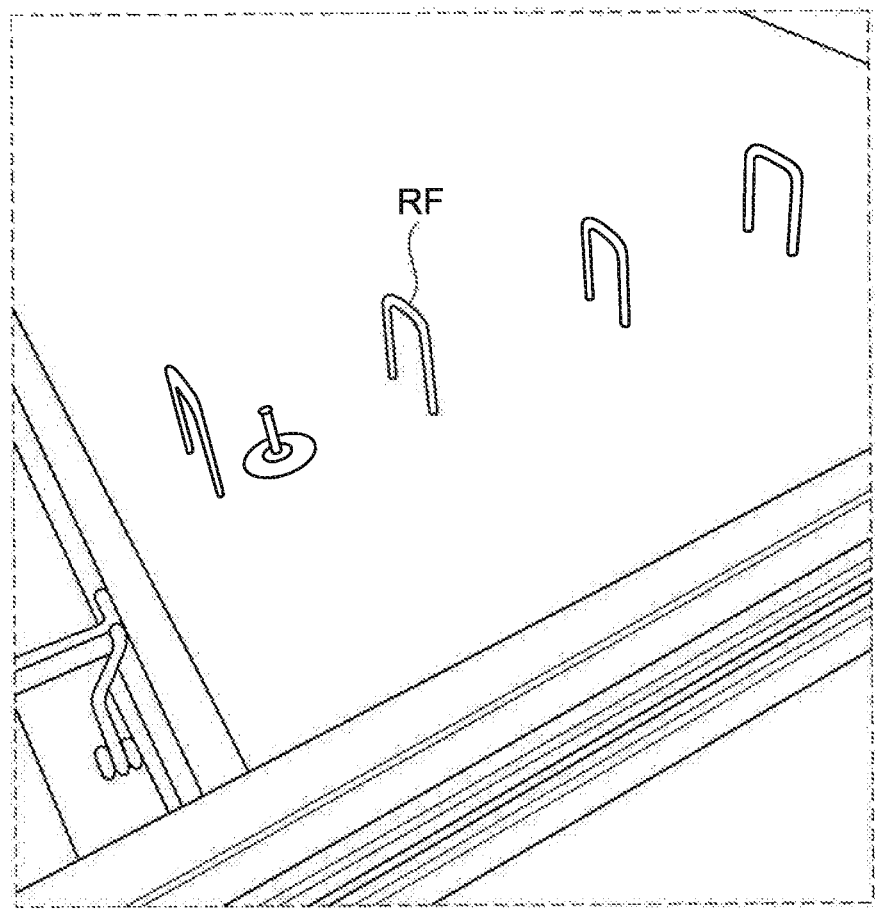

FIG. 1a shows three blocks arranged next to each other, as in the prior art, before high strength concrete is poured onto the top surface thereof, FIG. 1b shows a portion of an example of a preformed light aggregate concrete lower plate according to the present invention, the longitudinal direction of the plate being marked by letter L, FIG. 2 shows a slab-shaped building element according to the invention and comprising two monolithic lower concrete plates, and FIGS. 3a-g shows the various steps in the molding of the lower plate of a building element according to the invention, using a first embodiment of a molding apparatus, FIG. 4 shows an embodiment of a monolithic lower plate of a building element according to the invention, wherein a raised portion has been skipped, FIGS. 5-9 show the various steps in the molding of the lower plate of a building element according to the invention, using a second embodiment of a molding apparatus, FIGS. 10 and 11 show an insert placed where a raised portion has been skipped, before and after pouring of higher strength concrete, FIGS. 12 and 13 shows stages in the making of an embodiment of a building element according to the invention with curved sides, FIGS. 14 and 15 show various inserts that may be used to provide for surface recesses in the building element, and FIG. 16 shows reinforcements for anchoring of an additional top layer of concrete poured in a subsequent step.

FIG. 1a shows three individual prior art preformed light aggregate porous concrete blocks B laid out next to each other for the purpose of subsequent concrete overlaying in a known process. The blocks B have flattened top portions 5, longitudinal sides 6 and transverse sides 9; reinforcing bars (not shown) are placed along the longitudinal sides 6 prior to the overlaying.

In the overlaying process a layer (not shown) of concrete of higher strength is poured onto the top surface of the blocks B to form a coherent slab-shaped building element having at least dimensions L and W, as shown, and a thickness exceeding the height H of the blocks B.

The blocks B have a base 1 with a lower surface which is visible from below the finished building element. A small inherent gap 2 between the blocks B allows for some of the poured concrete to flow in the direction from the top surface of the blocks B and towards the lower surface, and to be visible from below the finished building element. After the poured concrete has hardened the building element becomes a coherent unitary structure by the poured concrete slightly penetrating into and bonding to the upper surface of the porous concrete blocks B. The blocks B provide for a fire resistance by protecting the overlaid concrete against direct exposure to fire, and for certain desired acoustical properties of the building element resulting from the porous structure of the light aggregate concrete.

FIG. 1b shows a corner section of an example of a preformed light aggregate concrete plate 10 according to the present invention and which is a monolithic structure made using a number of individual molds, as will be explained further below. The plate 10 has a base 11 contiguous with a plurality of raised elongated portions 14 integral therewith and upon which concrete of higher strength is poured in a subsequent step of making a slab-shaped building element. The raised portions 14 have top faces 15, longitudinal sides 16 and transverse sides 19. The plate 10 will in the following be referred to as a "lower" concrete plate while a higher strength plate formed as the overlaid concrete sets will be referred to as an "upper" concrete plate bonded to the lower concrete plate to form the slab-shaped building element. The sides 16, 19 preferably diverge outwards in direction from the top face 15, to allow for an easy upward removal of the molds used for making the raised portions, as explained below.

FIG. 2 shows such a slab-shaped element E comprising two such monolithic lower concrete plates 10, 10' described with reference to FIG. 1b placed next to each other and overlaid with higher strength concrete forming an upper concrete plate drawn schematically in thin line and identified by numeral 20. Each lower concrete plate 10, 10' is a monolithic structure having a base 11 with in this case a total of nine raised portions 14 integral therewith. The dimensions of the lower concrete plate may be selected in accordance with a given modular configuration; by way of example a plate module may have dimensions of 1.2 m×2.4 m corresponding to a lower plate having a base 11 contiguous with, by way of example, an arrangement of three by four identical raised portions 14.

Prior to the pouring of the higher strength concrete a network of recesses 17, 29 extending between the raised portions 14 in the direction of the width W and the length L of the lower plate 10 is filled with reinforcing bars. Preferably the reinforcing bars in the direction of the length L are pre-tensioned such that compressive forces are set up in the upper plate portion of the finished element E in that direction. The slab-shaped element E may then be used as a floor element in a building, spanning between opposite supports, such as opposite walls. To provide for longer spans the building element may be composed of several prefabricated monolithic plates 10, 10' laid out next to each other and overlaid with concrete after arranging pre-tensioning cables along a combined length of the plates 10, 10'. As shown by letters CA the upper plate in the direction of the width W acts to take up forces in the manner of a plurality of compression arches having a height increasing, preferably continuously, from the top faces 15 towards the recesses 29, the top faces preferably appearing slightly vaulted when seen from the end face 9. The upper concrete plate preferably is poured to extend also beyond the sides of the lower concrete plate, such that the element E appears with sides 25 enclosing the sides of the lower concrete plate 10.

FIG. 3a shows an apparatus A including various molds used for making a monolithic lower plate 10 as shown in FIG. 2. The apparatus A generally includes a first mold 100 in the form of a flat bed having dimensions corresponding approximately to the dimensions L and W shown in FIG. 2, and of which only a small portion is shown. A frame (not shown) supports a second, box-shaped mold 120 in such a manner that this second mold 120 can be moved up and down away from and towards the first mold 100, into a lowered position leaving a gap 110 between a lower peripheral edge 122 of the second mold 120 and the upper surface of the first mold 100.

The box-shaped second mold 120 has dimensions and internal shape corresponding to a raised portion 14 to be formed, and is open at the top to receive a portion 210 of the first type of relatively low strength concrete referred to above, which preferably is porous and includes a light aggregate, supplied by a supply unit 200 movable to a position above the top opening of the second mold 120. The second mold 120 has opposite parallel side walls shaped according to the form of the sides 16, 19 of the raised portions 14, and is open at the bottom to form a discharge opening.

FIG. 3b shows the supply unit 200 in position above the second mold 120 with concrete being discharged into the second mold. In FIG. 3d the supply unit 200 has been moved away and a head 185 of a piston has been moved through the top opening of the second mold 120 to compress the concrete material 210 in the second mold 120, such as to give a 10%-30% dimensional reduction in the second mold 120, and to give the top face 15 of the raised portion 14 a desired flat or upwardly curved shape. Simultaneously, or in connection with this compression, the material 210 in the second mold 120 is vibrated, by the first or the second mold, such that a small portion of the material on the second mold 120 will stand out sideways from the second mold at the gap 110, and for the purpose of bonding this material portion with that of a base 11 of a raised portion 14' previously formed on the surface of the first mold 100, as illustrated schematically in FIG. 3g. The material portion at the gap 110 eventually defines the aforementioned base 11 of the lower plate 10 as this material portion of all successively molded material 210 is bonded through the vibration.

It will be understood that the frame discussed in connection with FIGS. 3a-g may carry several second molds 120 to mold in one step one row of contiguous raised portions 14 and base portions 11, whereafter the frame is moved relative to the first mold 100 such that a next row contiguous therewith may be formed, the vibration providing a bonding of the two rows at the level of the base 11. An embodiment of such an apparatus A, for making a monolithic lower concrete plate 10 as shown in FIG. 4 will be discussed in the following with reference to FIGS. 5-9. As will be understood many of the operating principles and apparatus parts now described will correspond to those discussed above.

Figure 5:
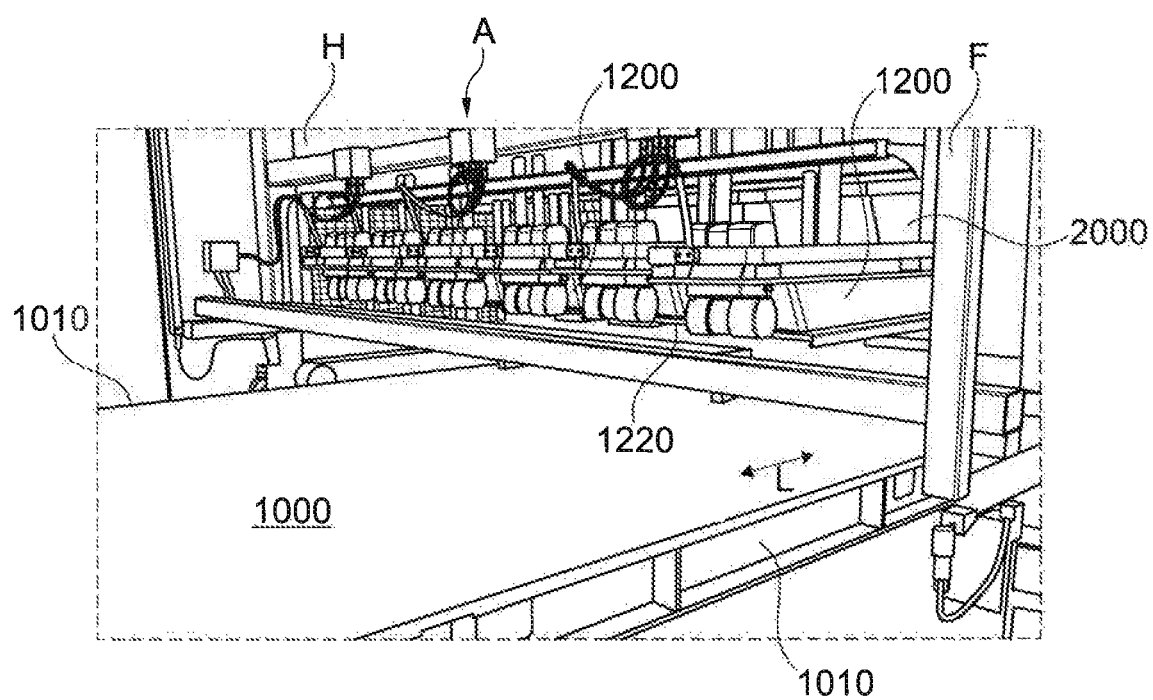

The apparatus A of FIG. 5 generally includes a first mold 1000 in the form of a flat bed having a width corresponding to the width of the final building element E, and of which only a small portion is shown. A frame F of the apparatus A is configured to move stepwise along the length of the flat bed 1000, in one direction of the arrows marked by letter L to indicate a longitudinal direction as in FIG. 2. The frame F supports a hopper H (not shown in details) that spans across the width of the flat bed 1000 and that supplies concrete to individual movable box-shaped dosing devices 2000 located on the frame between the hopper H and the flat bed 1000. In FIG. 5 the dosing devices 2000 are shown in an initial retracted position. The frame F also supports a number—in this case six—of second molds 1200 by means of respective hydraulically adjustable cylinders mounted to allow for the particular movement of the dosing devices 2000 described below. Each second mold 1200 has an internal configuration with sides that resemble the shape of the sides 16, 19 of a respective raised portion 14 (see FIG. 2) and is open at the top and at the bottom, with the sides having a lower peripheral edge 1220.

Figure 6:
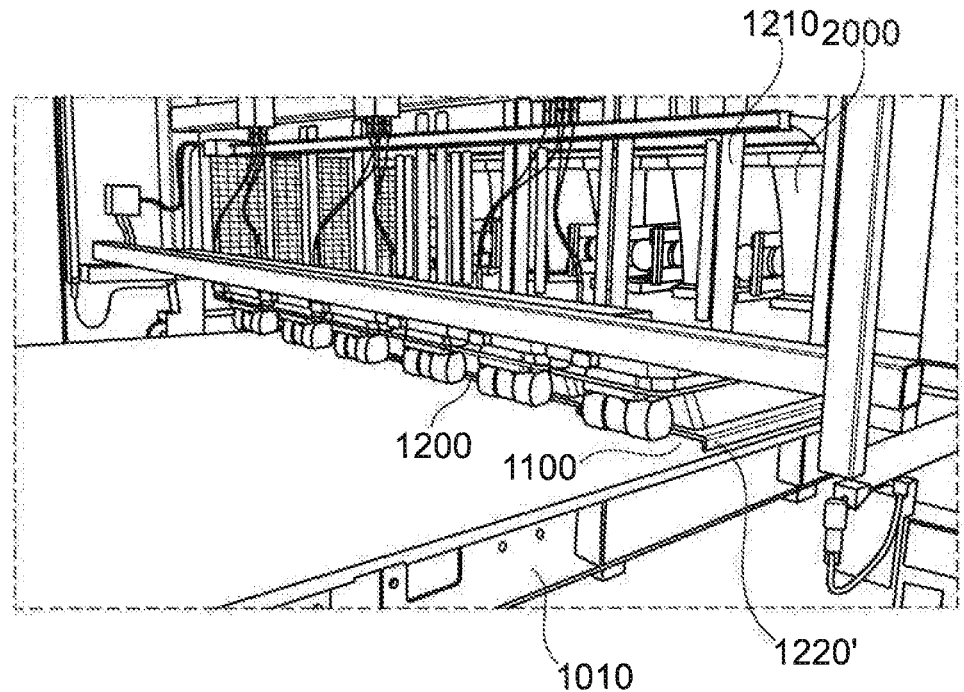

The support of the second molds 1200 is such that the second molds 1200 can be moved up and down individually away from and towards the first mold 1000, into a lowered position as shown in FIG. 6 leaving a gap 1100 between their lower peripheral edge 1220 and the upper surface of the first mold 100. The frame F with the hopper H and the dosing devices 2000 is preferably adjustable in the height to allow for the mounting below the dosing devices 2000 of other molds 1200 of the second type that have a greater height, to form raised portions 14 of a greater height.

Figure 7:
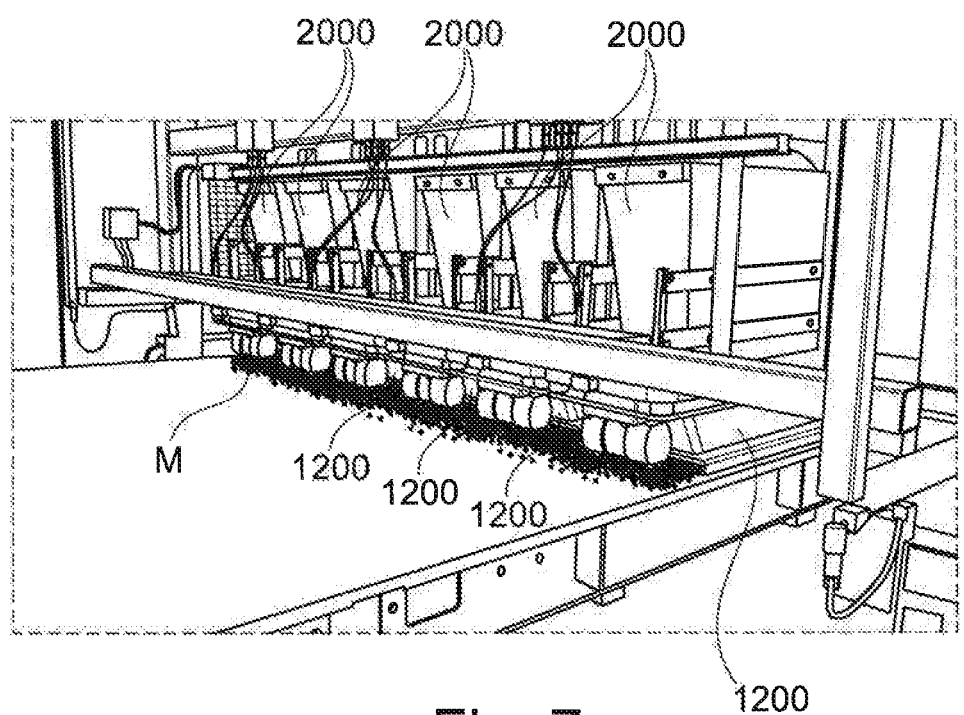

In FIG. 6 all the second molds 1200 have been lowered to a position leaving the aforementioned gap 1100. In FIG. 7 each dosing devices 2000 has then been advanced relative to the frame F in the direction of the arrow shown in FIG. 5 to the shown position above its corresponding second mold 1200, the bottom of the hopper H being now closed by a closure, such as one or more slidable plates.

The dosing devices 2000 are essentially box-shaped structures that taper from an open top towards an open bottom, with respective closures at the bottom configured to withhold material M in the dosing device 2000 as the latter is subsequently retracted back to the initial position below the hopper H; these closures may by way of example comprise a plate structure mounted on the frame F and onto which the dosing devices 2000 slide during retraction. In this way the dosing devices 2000 may be configured to contain a relatively large volume of material M for a relatively large volume shot, such that replacement of the dosing devices 2000 may not be required where relatively small volume second molds 1200 are replaced for forming raised portions 14 of a greater height, as discussed above.

In FIG. 7 each second mold 1200 is supplied at this time by gravity with concrete from a respective one of the dosing devices 2000, and this material is deposited on the flat bed 1000. A small portion of this material flows sideways out of the second molds 1200 at their open bottom; in a subsequent process step this outflowing material M is worked so as to bond with material previously deposited on the flat bed 1000, as explained below. The two molds 1200 of the second type located at each opposite edge 1010 of the flat bed 1000 may be so configured along a part 1220' of their peripheral edge 1220 close to the edge 1010 that essentially no gap 1100 is provided for, to limit sideways outflow of concrete from the second mold 1200, as shown in FIG. 7.

Turning now to FIG. 8 a series of pistons 1800 having respective heads 1850 are shown. Having retracted the dosing devices 2000 to their initial position the heads 1850 may now be lowered into the box-shaped second molds 1200 through their open top, in principle in the manner shown in FIG. 3*d*. The heads 1850 are shaped to give the raised portions 14 their desired shape as the heads are pressed lightly against material M inside the second molds 1200. At the same time vibrators V mounted to each second mold 1200 are activated to vibrate to second molds 1200 and, hence, material M therein. Preferably, damping means are provided such that vibrations are limited to the second molds 1200. The vibrations not only provides for a good compacting of the material M within the second molds 1200 but also ensures that all deposited material M close to the flat bed 1000 is worked together to establish a material bond not only cross-wise to the flat bed 1000 but also in the longitudinal direction L thereof, i.e. by being worked together also with material previously discharged before advancing the frame F in the direction of the arrow shown in FIG. 5. Proper vibration time and pressure applied by the heads 1850 may be determined experimentally. Since the material M, i.e. the less strong concrete, typically has a low flowability excessive material will not exit at the gap 1100.

In a final step shown in FIG. 9 the second molds 1200 are preferably first raised by the cylinders 1210 with the heads 1850 still in contact with the top portion of the discharged material M. This is to prevent any material from following the second molds 1200 by providing a slight downward oriented pressure on the material. The heads 1850 are then raised fully to allow for subsequent unrestricted movement of the dosing devices 2000 and the frame F is advanced as desired to mold a desired length of the monolithic plate shown in FIG. 4.

After having molded a desired length of the monolithic plate 10 falsework (not shown) may be placed across the width of the flat bed 1000. The frame F may then be moved past this falsework after which molding of another lower concrete plate 10 is initiated in the manner discussed above. The falsework is preferably positioned at a certain minimum distance from the raised portions 14, such as eg. 10-30 cm, and the higher strength concrete poured onto the cured lower concrete plate 10 in the final process step discussed below flows into the space between the cured lower concrete plate 10 and the falsework to define what regularly will be one of the ends of the building element E, i.e. a part resting on a supporting building structure.

In the final step of making the building element E concrete of higher strength is poured onto the material M previously deposited on the flat bed 1000 as described above, to form the upper concrete plate 20. For this purpose the flat bed first mold 1000 has side plates (not shown) mounted to or mountable onto the opposite edges 1010 and extending up to and above the level of the top of the raised portions 14, preferably at a distance from the sides 16 of the outermost raised portions. In this configuration the cured lower plate 10 together with the side plates and any cross-wise falsework as mentioned above will define a third mold for curing the concrete of the upper concrete plate 20. As will be understood, in this manner the concrete of higher strength flows to completely cover all the parts of the lower concrete plate 10 visible in FIG. 4.

The length of the flat bed defining the first mold 100 may by way of example be in the order of 50-100 m with tensioning devices being arranged at each end for establishing a pre-tension in wires (not shown) extended between the ends of the first mold 100 after completion of a desired number of the processes described above with reference to FIGS. 5-9. After curing of the upper plate portion 20, building elements E of desired length are made by transverse cuts cutting the pre-tensioned wires to setup compressive forces in the upper plate portion of the individual finished building element E that may have a length in the order of 10 metres. As will be understood the making of a building element E is a continuous process carried out within a relatively short time, such as 12 hours, which will allow for curing of the light aggregate concrete, laying out of the reinforcing bars in the recesses 17, 29 between the raised portions 14, and overlaying by the high strength concrete in a step of pouring out this higher strength concrete on top of the plate(s) 10, while the lower plate 10 is still supported by the first mold 100, 1000, and then a leveling of this material to provide for a smooth and even upper face of the element E, after which curing of the higher strength concrete is allowed for.

In principle the higher strength concrete may be a concrete having similar or identical properties to concrete normally used for making slab-shaped flooring elements for buildings. The less strength concrete is preferably a mixture of cement, sand and a light aggregate such as expanded clay or pumice and which has little or no tensile strength and a low compressive strength. In the uncured form this material 210, M has a high viscosity and the purpose of the aforementioned compression or compacting and vibrating is not only to give the raised portions 14 the desired shape but also to ensure a high degree of intimate bonding between the material of one material discharge with that of an adjoining one as material exits the narrow gap 110, 1100 and contacts adjoining material. This bonding has the effect that the lower plate 10 appears as a monolithic structure without any furrows appearing on the lower surface thereof. Such furrows could allow for the higher strength concrete subsequently applied to flow towards the lower surface of the lower plate 10 and be visible on the lower surface of the finished building element E, reducing the acoustical properties and also providing an undesired pathway for direct heat transmission between a lower building level and an upper one.

It is noted that according to an alternative embodiment a continuous layer of the first type concrete material 210, M may be spread onto the first mold 100, 1000 as a first step, with this layer having a thickness corresponding essentially to that of the gap 110, 1100 discussed above, whereafter the concrete material 210, M is discharged and vibrated as discussed above to provide for a monolithic plate 10; with the apparatus of FIGS. 5-9 the second molds 1200 would in this case be placed with their lower peripheral edge in direct contact with the layer spread onto the first mold 1000.

A first layer C (shown in FIG. 2) of another cementitious material, such as mortar, or of a another material such as a glass fiber web, may additionally be spread or placed onto the first mold 100 before applying the first type concrete material 210, in which case the second type molds 120, 1200 will be held at a distance above this first layer corresponding to the aforementioned gap 110, 1100. Such a layer may better prepare the finished building element E for painting.

Where the finished building element E is to have through-going openings it may in some cases be desirable to form the lower plate 10 with through-going apertures by leaving out some of the raised portions 14. FIG. 9 shows an example where some portions or blocks 14 have been skipped, such as by not discharging concrete from one of the molds 1200 in a row when using an apparatus with several such molds of the type shown in FIG. 5-9. An insert I with a vertical passage may then be placed on the first mold 1100 where a block 14 has been skipped, as shown in FIG. 10, after which pouring of the higher strength concrete is initiated. FIG. 11 shows the element E with the insert I having a vertical passage with a square cross-section.

Where the term strength is used herein reference is generally made to the compressive strength of the finished cured concrete plate. Where in this text the phrase "at least one second mold" is used reference is made to any apparatus having one second mold, or a group comprising two or more second molds linked together.

EXAMPLE

A first type concrete for making the lower concrete plate 10 was prepared with an expanded clay aggregate of median size of 4-10 mm, and in addition thereto fine sand, the wet concrete being compressible by 10%-30%, the compression and vibration yielding a final density of about 600-800 kg/m³. A compressive strength in the order of 3 MPa was obtained thereby.

FIGS. 12 and 13 shows stages in the making of an element E before and after pouring the higher-strength concrete and where falsework FW is placed cross-wise on the first mold 1000 to give the building element E curved sides.

FIGS. 14 and 15 show various inserts 12 that may be placed on the first mold 100 to provide for surface recesses in the element E.

FIG. 16 shows reinforcements RF anchored in the higher strength concrete to allow for anchoring of an additional top layer of concrete poured in a subsequent step, preferably after a raking or other surface roughening of the higher strength concrete that forms the concrete plate 10, 10 shown in FIG. 2.

The invention claimed is:

1. An apparatus for casting a reinforced slab-shaped building element (E) having a length (L), a width (W) and a thickness, said slab-shaped building element (E) comprising an upper concrete plate (20) anchored to a lower concrete plate (10) with a top surface and a bottom surface, said upper concrete plate (20) being cast from relatively higher strength concrete laid out upon said top surface, said lower concrete plate (10) being of a less strong first type concrete, said lower concrete plate (10) including a base (11) contiguous with a plurality of raised portions (14) integral therewith, said raised portions (14) being spaced apart in the direction of said length (L) and said width (W), said plurality of raised portions (14) defining between them a network of recesses (17, 29), at least some of said recesses (17, 29) including reinforcing bars (R), said raised portions (14) and said recesses (17, 29) together defining said top surface, said apparatus including:
  a) a first mold (100, 1000) defining a support for said lower plate (10) being cast,
  b) at least one second mold (120, 1200) having a lower peripheral edge (122) and an internal shape corresponding to a respective one of said raised portions (14),
  c) a frame (F) movable along a length of said first mold (1000) and supporting a number of said second molds (120, 1200), said second molds (120, 1200) having an opening at a bottom thereof and being vertically movable in relation to said frame (F), wherein said frame (F) supports said second molds (120, 1200) such that there is a gap (110) between the lower peripheral edge (122) and an upper surface of the first mold (100, 1000) or between the lower peripheral edge (122) an upper surface of a material layer (C) on an upper surface of the first mold (100, 1000),
  d) a dosing device (2000, 2000) for administering concrete to said second molds (120, 1200), and
  e) vibrating devices (V) for vibrating said second molds such that a portion of the concrete extends sideways from the second mold at the gap (110) to define the base (11).

2. The apparatus of claim 1, including a hopper (H) dispensing said first type concrete into dosing devices (2000) corresponding to a respective second mold (1200), said dosing devices (2000) being movable relative to said second molds (1200) along the length of said first mold (1000).

3. The apparatus of claim 1, including pressure heads (185, 1850) configured to be lowered into said second molds (1200) through an open top thereof, said pressure heads (1850) having a shape corresponding to a top face (15) of said raised portions (14) and configured for compressing concrete in said second molds (1200).

4. The apparatus according to claim 1, further comprising:
a closure being provided to prevent discharge of said first type concrete on said dosing devices (2000) being moved away from said second molds (1200).

5. The apparatus according to claim 1, including tensioning devices arranged at opposing ends of said first mold (1000) for establishing a pre-tension in wires (not shown) extended between said ends.

6. An apparatus for casting a reinforced slab-shaped building element (E) having a length (L), a width (W) and a thickness, said slab-shaped building element (E) comprising an upper concrete plate (20) anchored to a lower concrete plate (10) with a top surface and a bottom surface, said upper concrete plate (20) being cast from relatively higher strength concrete laid out upon said top surface, said lower concrete plate (10) being of a less strong first type concrete, said lower concrete plate (10) including a base (11) contiguous with a plurality of raised portions (14) integral therewith, said raised portions (14) being spaced apart in the direction of said length (L) and said width (W), said plurality of raised portions (14) defining between them a network of recesses (17, 29), at least some of said recesses (17, 29) including reinforcing bars (R), said raised portions (14) and said recesses (17, 29) together defining said top surface, said apparatus including
  a) a first mold (100, 1000) defining a support for said lower plate (10) being cast,
  b) a plurality of said second molds (120, 1200) having a lower peripheral edge (122) and an internal shape corresponding to a respective one of said raised portions (14) and having an opening at a bottom thereof, and
  c) a dosing device (2000) for administering concrete to said second molds (120, 1200), characterized in
  d) a frame (F) movable along said first mold (1000), said frame (F) supporting said plurality of second molds (120, 1200), said second molds (120, 1200) being individually vertically movable in relation to said frame (F), wherein said frame (F) supports said second molds (120, 1200) such that there is a gap (110) between the lower peripheral edge (122) and an upper surface of the first mold (100, 1000) or between the lower peripheral edge (122) an upper surface of a material layer (C) on an upper surface of the first mold (100, 1000), and
  e) vibrating devices (V) for vibrating said second molds such that a portion of the concrete extends sideways from the second mold at the gap (110) to define the base (11).

7. The apparatus of claim 6, including a hopper (H) dispensing said first type concrete into dosing devices (2000) corresponding to a respective second mold (1200), said dosing devices (2000) being movable relative to said second molds (1200) along the length of said first mold (1000).

8. The apparatus of claim 6, including pressure heads (185, 1850) configured to be lowered into said second molds (1200) through an open top thereof, said pressure heads (1850) having a shape corresponding to a top face (15) of said raised portions (14).

9. The apparatus according to claim 6, a closure being provided to prevent discharge of said first type concrete on said dosing devices (2000) being moved away from said second molds (1200).

10. The apparatus according to claim 6, including tensioning devices arranged at opposing ends of said first mold (1000) for establishing a pre-tension in wires extended between said ends.

\* \* \* \* \*